US009435630B2

(12) United States Patent
Storrie et al.

(10) Patent No.: US 9,435,630 B2
(45) Date of Patent: *Sep. 6, 2016

(54) ACTUATOR AND LINEAR POSITION SENSOR ASSEMBLY

(71) Applicant: CTS Corporation, Elkhart, IN (US)

(72) Inventors: William D. Storrie, Motherwell (GB); Steven Brown, Amadale (GB); Gerard McCafferty, Glasgow (GB)

(73) Assignee: CTS CORPORATION, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,882

(22) Filed: Nov. 10, 2014

(65) Prior Publication Data

US 2015/0130447 A1   May 14, 2015

Related U.S. Application Data

(63) Continuation-in-part of application No. 14/191,009, filed on Feb. 26, 2014, now abandoned.

(60) Provisional application No. 61/903,144, filed on Nov. 12, 2013.

(51) Int. Cl.
*G01B 7/14* (2006.01)
*G01D 5/14* (2006.01)
(Continued)

(52) U.S. Cl.
CPC .............. *G01B 7/14* (2013.01); *F15B 15/10* (2013.01); *F15B 15/2861* (2013.01); *G01B 5/0032* (2013.01); *G01D 5/145* (2013.01); *G01D 11/245* (2013.01)

(58) Field of Classification Search
CPC .................. G01D 5/145; G01B 7/14
USPC ....................................... 324/207.24
See application file for complete search history.

(56) References Cited

U.S. PATENT DOCUMENTS 2,134,072 A   10/1938  Christensen
2,355,721 A    8/1944  Foutz
(Continued)

FOREIGN PATENT DOCUMENTS

CA      2635228       6/2007
DE      7424147      10/1974
(Continued)

OTHER PUBLICATIONS

Melexis (Microelectronic Integrated Systems) MLX90316 Rotary Position Sensor IC Data Sheet Dated Sep. 20, 2005, pp. 1-34, Melexis NV, Ieper, Belgium.
(Continued)

*Primary Examiner* — Reena Aurora
(74) *Attorney, Agent, or Firm* — Daniel Deneufbourg

(57) ABSTRACT

An actuator and sensor assembly with a housing defining a pocket and an access opening. A substrate with a sensor is located in the pocket through the access opening. A nozzle extends from the housing. A sleeve surrounds the nozzle and retains a hose on the nozzle. A connector assembly is located opposite and normal the pocket and the substrate. Compliant terminal pins extend generally normally from the connector assembly into the pocket and through-holes in the substrate. An actuator shaft gimbal includes a head located in a housing collar and a flexible neck extends through a housing aperture. A shoulder on the neck of the gimbal locks the gimbal in the collar.

12 Claims, 5 Drawing Sheets

(51) Int. Cl.
  *F15B 15/28* (2006.01)
  *G01B 5/00* (2006.01)
  *G01D 11/24* (2006.01)
  *F15B 15/10* (2006.01)

(56) References Cited

U.S. PATENT DOCUMENTS

| | | |
|---|---|---|
| 2,478,575 A | 8/1949 | Fitch |
| 2,738,808 A | 3/1956 | Hartzell et al. |
| 2,849,091 A | 8/1958 | Newell |
| 2,939,486 A | 6/1960 | Demay |
| 2,976,686 A | 3/1961 | Stelzer |
| 3,082,792 A | 3/1963 | Jenkins et al. |
| 3,136,227 A | 6/1964 | Williams |
| 3,397,621 A | 8/1968 | Groves |
| 3,509,795 A | 5/1970 | Woodward |
| 3,575,088 A | 4/1971 | Bauer |
| 3,648,571 A | 3/1972 | Burgess |
| 3,859,619 A | 1/1975 | Ishihara et al. |
| 3,911,793 A | 10/1975 | Izumi |
| 4,005,639 A | 2/1977 | Welsh |
| 4,056,043 A | 11/1977 | Sriramamurty et al. |
| 4,070,946 A | 1/1978 | Sandvik et al. |
| 4,088,977 A | 5/1978 | Bowman, Jr. et al. |
| 4,128,044 A | 12/1978 | Larson et al. |
| 4,230,077 A | 10/1980 | Ito |
| 4,237,076 A | 12/1980 | Benjamin et al. |
| 4,256,076 A | 3/1981 | Braddick |
| 4,282,800 A | 8/1981 | Young et al. |
| 4,283,679 A | 8/1981 | Ito et al. |
| 4,312,319 A | 1/1982 | Brakebill |
| 4,377,070 A | 3/1983 | Shadbourne |
| 4,403,538 A | 9/1983 | Rise |
| 4,437,386 A | 3/1984 | Baumgartner |
| 4,462,359 A | 7/1984 | Muller |
| 4,478,107 A | 10/1984 | Buannec |
| 4,502,847 A | 3/1985 | Pozniak et al. |
| 4,543,790 A | 10/1985 | Coll et al. |
| 4,639,667 A | 1/1987 | Andresen |
| 4,642,603 A | 2/1987 | Martinez, Jr. |
| 4,649,925 A | 3/1987 | Dow et al. |
| 4,733,214 A | 3/1988 | Andresen |
| 4,746,772 A | 5/1988 | Bovee et al. |
| 4,756,229 A | 7/1988 | Drakeley |
| 4,761,608 A | 8/1988 | Franklin et al. |
| 4,805,744 A | 2/1989 | Pringle |
| 4,809,657 A | 3/1989 | Sejimo et al. |
| 4,850,263 A | 7/1989 | Rumsey et al. |
| 4,857,842 A | 8/1989 | Sturman et al. |
| 4,915,018 A | 4/1990 | Scott et al. |
| 5,016,523 A | 5/1991 | Bowyer |
| 5,177,370 A | 1/1993 | Meister |
| 5,226,312 A | 7/1993 | Gautier et al. |
| 5,226,347 A | 7/1993 | Gautier et al. |
| 5,270,645 A | 12/1993 | Wheeler et al. |
| 5,293,811 A | 3/1994 | Delair et al. |
| 5,487,273 A | 1/1996 | Elpern et al. |
| 5,518,028 A | 5/1996 | Walker |
| 5,557,154 A | 9/1996 | Erhart |
| 5,570,015 A | 10/1996 | Takaishi et al. |
| 5,727,447 A | 3/1998 | Shiraishi |
| 5,771,774 A | 6/1998 | Stojic |
| 5,811,968 A | 9/1998 | Nakazawa et al. |
| 5,955,881 A | 9/1999 | White et al. |
| 6,018,241 A | 1/2000 | White et al. |
| 6,057,682 A | 5/2000 | McCurley et al. |
| 6,105,927 A | 8/2000 | Zelczer et al. |
| 6,155,048 A | 12/2000 | Vertanen |
| 6,164,187 A | 12/2000 | Stojic |
| 6,175,233 B1 | 1/2001 | McCurley et al. |
| 6,189,435 B1 | 2/2001 | Vertanen et al. |
| 6,255,941 B1 | 7/2001 | Osterman et al. |
| 6,289,602 B1 | 9/2001 | Chiddister |
| 6,304,078 B1 | 10/2001 | Jarrard et al. |
| 6,349,629 B1 | 2/2002 | Plantan et al. |
| 6,352,137 B1 | 3/2002 | Stegall et al. |
| 6,356,811 B1 | 3/2002 | Beselt |
| 6,360,649 B1 | 3/2002 | Plantan |
| 6,369,689 B1 | 4/2002 | Osmer et al. |
| 6,417,768 B2 | 7/2002 | Osterman et al. |
| 6,501,375 B1 | 12/2002 | Weant et al. |
| 6,526,866 B2 | 3/2003 | Pisoni et al. |
| 6,536,329 B2 | 3/2003 | Anderson et al. |
| 6,536,469 B2 | 3/2003 | Dilger et al. |
| 6,564,554 B2 | 5/2003 | Hercey et al. |
| 6,633,157 B1 | 10/2003 | Yamaki et al. |
| 6,662,708 B2 | 12/2003 | Hosny |
| 6,690,158 B2 | 2/2004 | Saito et al. |
| 6,748,848 B1 | 6/2004 | Riley et al. |
| 6,752,171 B1 | 6/2004 | Kemmler et al. |
| 6,794,779 B2 | 9/2004 | Ma et al. |
| 6,888,451 B1 | 5/2005 | Plantan |
| 6,968,742 B2 | 11/2005 | Rodenhauser et al. |
| 6,988,443 B2 | 1/2006 | Morris |
| 7,014,016 B2 | 3/2006 | Morris et al. |
| 7,044,444 B2 | 5/2006 | Haubold et al. |
| 7,053,604 B2 | 5/2006 | Laumen et al. |
| 7,116,210 B2 | 10/2006 | Lawrence et al. |
| 7,194,946 B2 | 3/2007 | Bacardit |
| 7,199,578 B2 | 4/2007 | Rohner et al. |
| 7,219,691 B2 | 5/2007 | Gethmann et al. |
| 7,340,895 B2 | 3/2008 | Noelle |
| 7,387,080 B2 | 6/2008 | Andronic |
| 7,423,421 B2 | 9/2008 | Reichert |
| 7,439,732 B2 | 10/2008 | LaPlaca |
| 7,451,690 B2 | 11/2008 | Schrader et al. |
| 7,454,979 B2 | 11/2008 | Frank et al. |
| 7,570,047 B2 | 8/2009 | Stuve et al. |
| 7,762,220 B2 | 7/2010 | Okanovic et al. |
| 7,823,385 B2 | 11/2010 | McEwen et al. |
| 7,852,067 B2 | 12/2010 | Schmid et al. |
| 7,946,555 B2 | 5/2011 | Ikeda |
| 8,395,374 B2 | 3/2013 | Newman et al. |
| 8,400,142 B2 | 3/2013 | Storrie et al. |
| 8,450,999 B2 * | 5/2013 | Wolschlager et al. ... 324/207.25 |
| 8,664,947 B2 * | 3/2014 | Storrie et al. ............ 324/207.24 |
| 8,803,514 B2 | 8/2014 | Newman et al. |
| 2003/0030958 A1 | 2/2003 | Saito et al. |
| 2004/0250678 A1 | 12/2004 | Bonotto et al. |
| 2005/0061144 A1 | 3/2005 | Schall |
| 2005/0087067 A1 | 4/2005 | Vermoesen et al. |
| 2005/0264280 A1 | 12/2005 | Shoji et al. |
| 2006/0176054 A1 | 8/2006 | LaPlaca |
| 2006/0208724 A1 | 9/2006 | Reichert et al. |
| 2007/0257219 A1 | 11/2007 | Perrin |
| 2008/0230328 A1 | 9/2008 | Lacroix et al. |
| 2009/0139587 A1 | 6/2009 | Spliethoff et al. |
| 2009/0140730 A1 | 6/2009 | Newman et al. |
| 2009/0205332 A1 | 8/2009 | Baeuerle et al. |
| 2009/0206846 A1 | 8/2009 | Sanchez et al. |
| 2010/0127697 A1 | 5/2010 | Storrie et al. |
| 2010/0282008 A1 | 11/2010 | Knudsen et al. |
| 2011/0079138 A1 | 4/2011 | Storrie et al. |
| 2011/0247484 A1 | 10/2011 | Klesbauer et al. |
| 2011/0262266 A1 | 10/2011 | Rakod et al. |
| 2011/0308897 A1 | 12/2011 | Wallace et al. |
| 2013/0232970 A1 | 9/2013 | Mavir et al. |
| 2013/0285649 A1 | 10/2013 | van der kuij et al. |
| 2014/0021808 A1 | 1/2014 | Palfenier et al. |

FOREIGN PATENT DOCUMENTS

| | | |
|---|---|---|
| DE | 29 23 644 | 12/1979 |
| DE | 100 59 337 | 6/2001 |
| DE | 203 08 810 | 10/2003 |
| DE | 10 2005 024 101 | 12/2005 |
| DE | 10 2005 013442 | 9/2006 |
| DE | 10 2005 029904 | 1/2007 |
| DE | 10 2006 021129 | 6/2007 |
| DE | 10 2006 021127 | 8/2007 |
| DE | 10 2008 030503 | 1/2009 |
| DE | 10 2008 011701 | 9/2009 |
| DE | 112008003309 | 10/2010 |
| DE | 10 2009 032958 | 1/2011 |

(56) References Cited

FOREIGN PATENT DOCUMENTS

| | | |
|---|---|---|
| DE | 20 2011 003003 | 5/2011 |
| DE | 112009003688 | 10/2012 |
| EP | 0096408 | 12/1983 |
| EP | 0261537 | 3/1988 |
| EP | 0738892 | 10/1996 |
| EP | 1182461 | 2/2002 |
| EP | 1662232 | 5/2006 |
| EP | 1701015 | 9/2006 |
| EP | 1884636 | 2/2008 |
| EP | 1972916 | 9/2008 |
| EP | 2068061 | 6/2009 |
| EP | 2161460 | 3/2010 |
| EP | 2208893 | 7/2010 |
| EP | 2199565 | 1/2011 |
| EP | 1852588 | 5/2011 |
| EP | 1852587 | 6/2011 |
| EP | 1852586 | 9/2011 |
| GB | 2256050 | 11/1992 |
| GB | 2261472 | 5/1993 |
| GB | 2322164 | 8/1998 |
| GB | 2468779 | 9/2010 |
| JP | H04-057704 | 5/1992 |
| JP | 05 264326 | 10/1993 |
| JP | H07-294209 | 11/1995 |
| JP | 2000193408 | 7/2000 |
| JP | 2000258109 | 9/2000 |
| JP | 2011505574 | 2/2011 |
| WO | 03/093769 | 11/2003 |
| WO | 2009/073170 | 6/2009 |
| WO | 2010068241 | 6/2010 |

OTHER PUBLICATIONS

CTS Corporation, EGR History with Poti Sensors (2011), 7 pages, Elkhart, Indiana.
WOCO Industrietechnik GmbH, Woco Actuators, www.wocogroup.com (2011), 1 page, Bad Soden-Salmunster, Germany.
SMK, SMK Actuators, www.smk-systeme.de (2011), 2 pages, Filderstadt, Germany.
Padmini VNA Mechatronics Pvt. Ltd., Padmini EGR/Secondary AIR Injection, www.padminivna.com (2009), 1 page, Gurgaon, India.
Padmini VNA Mechatronics Pvt. Ltd., Padmini Actuator, www.padminivna.com (2009), 1 page, Gurgaon, India.
CTS Automotive Products, product brochure for 586 Series Non-Contacting 2-Piece Linear Position Sensor (2009), 2 pages, Elkhart, Indiana.
CTS Corporation, CTS 569 Turbo Sensor, Exploded Views and Cross Section Detail (2011), 4 pages, Elkhart, Indiana.
CTS Automotive Products, product brochure for 569 Series High Temperature Linear Position Sensor (2007), 2 pages, Elkhart, Indiana.
CTS Automotive Products, product brochure for 537 Series Linear EGR Sensor (2007), 2 pages, Elkhart, Indiana.
INZI Controls Company, INZI Vacuum Actuators, www.inzicontrols.devu.kr (2007), 3 pages, Kyunggi-do, Korea.

\* cited by examiner

ACTUATOR AND LINEAR POSITION SENSOR ASSEMBLY

CROSS-REFERENCE TO RELATED AND CO-PENDING APPLICATIONS

This application is a continuation-in-part application which claims the benefit of the filing date of co-pending U.S. patent application Ser. No. 14/191,009 filed on Feb. 26, 2014 which is a continuation of U.S. patent application Ser. No. 12/962,773 filed on Dec. 8, 2010 now U.S. Pat. No. 8,664, 047 issued on Mar. 4, 2014.

This application also claims the benefit of the filing date and disclosure of U.S. Provisional Patent Application Ser. No. 61/903,144 filed on Nov. 12, 2013 which is incorporated herein by reference as are all references cited therein.

FIELD OF THE INVENTION

This invention relates, in general, to an actuator and sensor assembly and, more particularly, to a non-contacting linear position sensor coupled to an actuator.

BACKGROUND OF THE INVENTION

Position sensing is used to electronically monitor the position or movement of a mechanical component. The position sensor is coupled to an actuator and is adapted to produce an electrical signal that varies as the position of the component in question varies. Actuator and sensor assemblies are included in many products. For example, actuator and sensor assemblies allow the status of various automotive components to be monitored and controlled electronically.

A position sensor needs to be accurate, in that it must give an appropriate electrical signal based upon the position measured. If inaccurate, a position sensor may hinder the proper evaluation and control of the position of the component being monitored.

Typically, it is also a requirement that a position sensor be adequately precise in its measurement. However, the precision needed in measuring a position will obviously vary depending upon the particular circumstances of use. For some purposes, only a rough indication of position is necessary; for instance, an indication of whether a valve is mostly open or mostly closed. In other applications, more precise indication of position may be needed.

A position sensor should also be sufficiently durable for the environment in which it is placed. For example, a position sensor used on an automotive valve may experience almost constant movement while the automobile is in operation. Such a position sensor should be constructed of mechanical and electrical components adequate to allow the sensor to remain sufficiently accurate and precise during its projected lifetime, despite considerable mechanical vibrations and thermal extremes and gradients.

In the past, position sensors were typically of the "contact" variety. A contacting position sensor requires physical contact to produce the electrical signal. Contacting position sensors typically consist of potentiometers that produce electrical signals which vary as a function of the component's position. Contacting position sensors are generally accurate and precise. Unfortunately, the wear due to contact during movement has limited their durability. Also, the friction resulting from the contact can degrade the operation of the component. Further, water intrusion into a potentiometric sensor can disable the sensor.

One advancement in sensor technology has been the development of non-contacting position sensors. A non-contacting position sensor ("NPS") does not require physical contact between the signal generator and the sensing element. Instead, an NPS utilizes one or more magnets to generate magnetic fields that vary as a function of position, and devices to detect varying magnetic fields to measure the position of the component to be monitored. Often, a Hall Effect device is used to produce an electrical signal that is dependent upon the magnitude, polarity, or direction of the magnetic flux incident upon the device. The Hall Effect device may be physically attached to the component to be monitored and thus moves relative to the stationary magnet(s) as the component moves. Conversely, the Hall Effect device may be stationary with the magnet(s) affixed directly or indirectly to the component to be monitored. In either case, the position of the component to be monitored can be determined by the electrical signal produced by the Hall Effect device.

Although currently available actuator and NPS assemblies have proven satisfactory, there continues to be a need for improved, lower cost actuator and NPS assemblies.

SUMMARY OF THE INVENTION

The present invention is directed to an actuator and sensor assembly comprising a sensor housing including an interior wall defining a pocket accessible through an opening in the sensor housing, a sensor substrate located in the pocket through the opening in the sensor housing, the sensor substrate having a sensor and defining a plurality of conductive through-holes, a hose retention assembly including a nozzle extending from the sensor housing and a sleeve surrounding and spaced from the nozzle, a hose coupled to and surrounding the nozzle and the sleeve surrounding and abutting against the hose for retaining the hose on the nozzle, a connector assembly associated with the sensor housing and located opposite and generally normal to the pocket and the substrate and including a plurality of compliant terminal pins extending into the pocket and the plurality of through-holes in the sensor substrate respectively, an actuator housing coupled to the sensor housing and together defining an interior cavity and an actuator housing aperture in communication with the interior cavity, the actuator housing including an interior collar, a gimbal including a head located in the collar and a flexible neck extending through the actuator housing aperture in the actuator housing and terminating in a shoulder that retains the gimbal in the collar of the actuator housing, an O-ring surrounding the head of the gimbal and in sealing abutting relationship with the interior surface of the collar of the actuator housing, a magnet carrier located and movable in the interior cavity and including, a magnet adapted to generate a magnetic field and the sensor adapted to sense a change in the magnetic field in response to the movement of the carrier and the magnet in the interior cavity relative to the sensor, and an actuator shaft including a first end extending through the aperture in the actuator housing and the gimbal and coupled to the magnet carrier.

In one embodiment, the actuator and sensor assembly further comprises a flexible diaphragm located in the interior cavity, the magnet carrier being seated on the flexible diaphragm, a spring located in the interior cavity against the magnet carrier and biasing the magnet carrier in a first position, and a source of pressurization coupled to one of the sensor housing or the actuator housing and in fluid flow communication with the interior cavity for adjusting the pressure in the interior cavity and causing the movement of the flexible diaphragm and the magnet carrier.

In one embodiment, a plurality of clips on one of the sensor housing or the actuator housing couple the sensor housing and the actuator housing together.

In one embodiment, a plug seals the opening defined in the sensor housing and a spacer located in the pocket between the substrate and the plug for exerting a compressive force against the substrate and preventing vibration of the substrate.

In one embodiment, the plurality of terminal pins extend through the interior wall of the pocket and into the pocket.

In one embodiment, the connector assembly further comprises a holder for the plurality of terminal pins, the holder being retained in a through-hole defined in the interior wall of the pocket.

In one embodiment, the neck of the gimbal is comprised of a plurality of spaced apart ribs adapted for flexing movement towards and away from each other during coupling of the gimbal to the collar of the actuator housing.

The present invention is also directed to a sensor assembly comprising a sensor housing including an interior wall defining a pocket accessible through an opening defined in the sensor housing, a substrate located in the interior pocket through the opening in the sensor housing and defining a plurality of conductive through-holes, a sensor on the substrate, a connector assembly unitary with the sensor housing and positioned in a relationship opposite and generally normal to the pocket and the substrate, the connector assembly including a plurality of compliant terminal pins extending into the plurality of conductive through-holes in the substrate and in a relationship generally normal to the substrate, and a magnet located in the sensor housing in a relationship spaced from the pocket of the sensor housing and the sensor, the magnet generating a magnetic field and the sensor adapted to sense a change in the magnitude and direction of the magnetic field in response to the movement of the magnet relative to the sensor.

In one embodiment, the connector assembly includes a holder for the plurality of terminal pins, the holder being retained in the interior wall of the pocket.

The present invention is further directed to an actuator assembly comprising an actuator housing defining an interior cavity and an interior wall defining an aperture in communication with the interior cavity, the actuator housing including an interior collar, a gimbal including a head located in the collar and a flexible neck extending through the aperture in the actuator housing and terminating in a shoulder that retains the gimbal in the collar of the actuator housing, an O-ring surrounding the head of the gimbal and in sealing abutting relationship with the interior surface of the collar of the actuator housing, and an actuator shaft including a first end extending through the aperture in the actuator housing and the gimbal and coupled to the magnet carrier.

In one embodiment, the flexible neck is comprised of a plurality of flexible ribs each including a shoulder having an exterior angled surface, the ribs being adapted for flexing movement towards and away from each other when the gimbal is secured to the collar of the actuator housing.

In one embodiment, an actuator shaft extends through the gimbal.

Other advantages and features of the present invention will be more readily apparent from the following detailed description of the preferred embodiment of the invention, the accompanying drawings, and the appended claims.

BRIEF DESCRIPTION OF THE DRAWINGS

In the accompanying drawings that form part of the specification, and in which like numerals are employed to designate like parts throughout the same.

DETAILED DESCRIPTION OF THE EMBODIMENT

Figure 1:
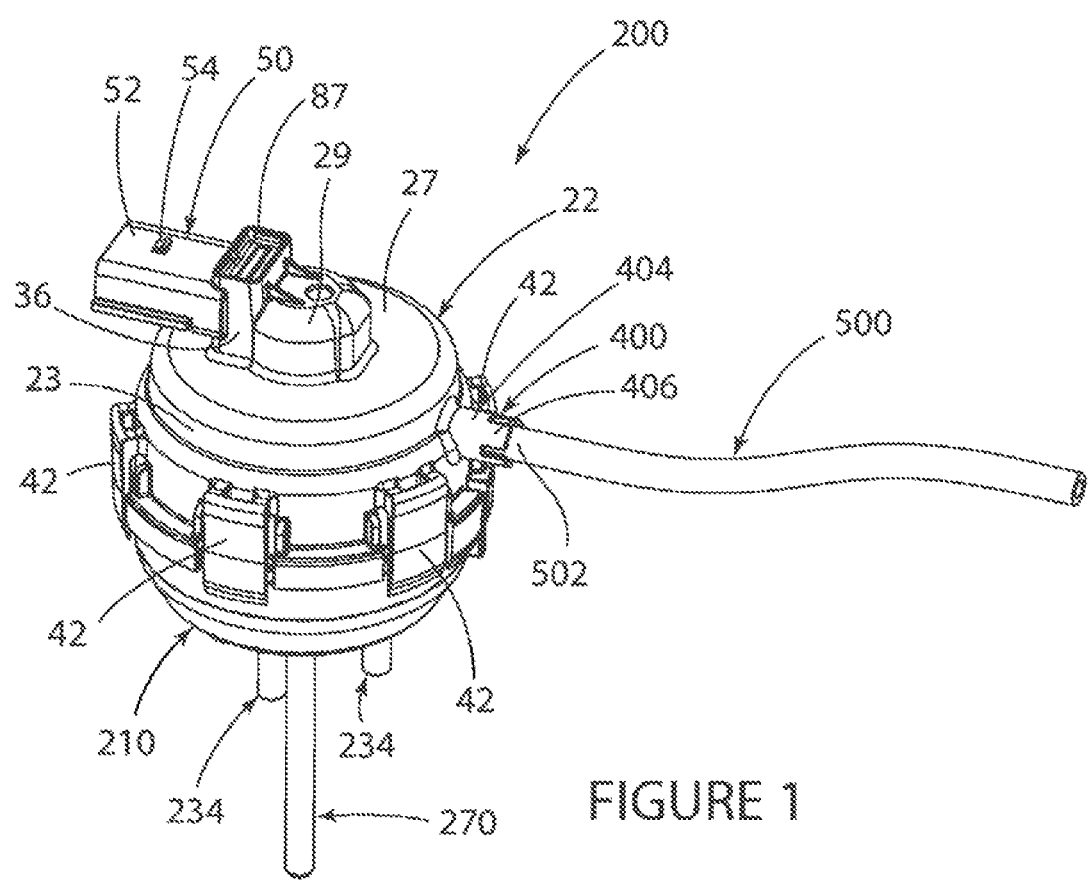
FIG. 1 is a perspective view of an actuator and linear position sensor assembly in accordance with the present invention.

An actuator and linear position sensor assembly 200 it accordance with the present invention is shown in FIGS. 1, 2, 3, and 4.

Actuator and sensor assembly 200 initially comprises an upper or top sensor housing or cover member 22 and a separate lower or bottom actuator housing member 210 which are coupled and clipped together and define an interior housing or enclosure or chamber for a plurality of elements including a combination piston/magnet carrier assembly 100 and a spring 150 as described in more detail below.

Figure 3:
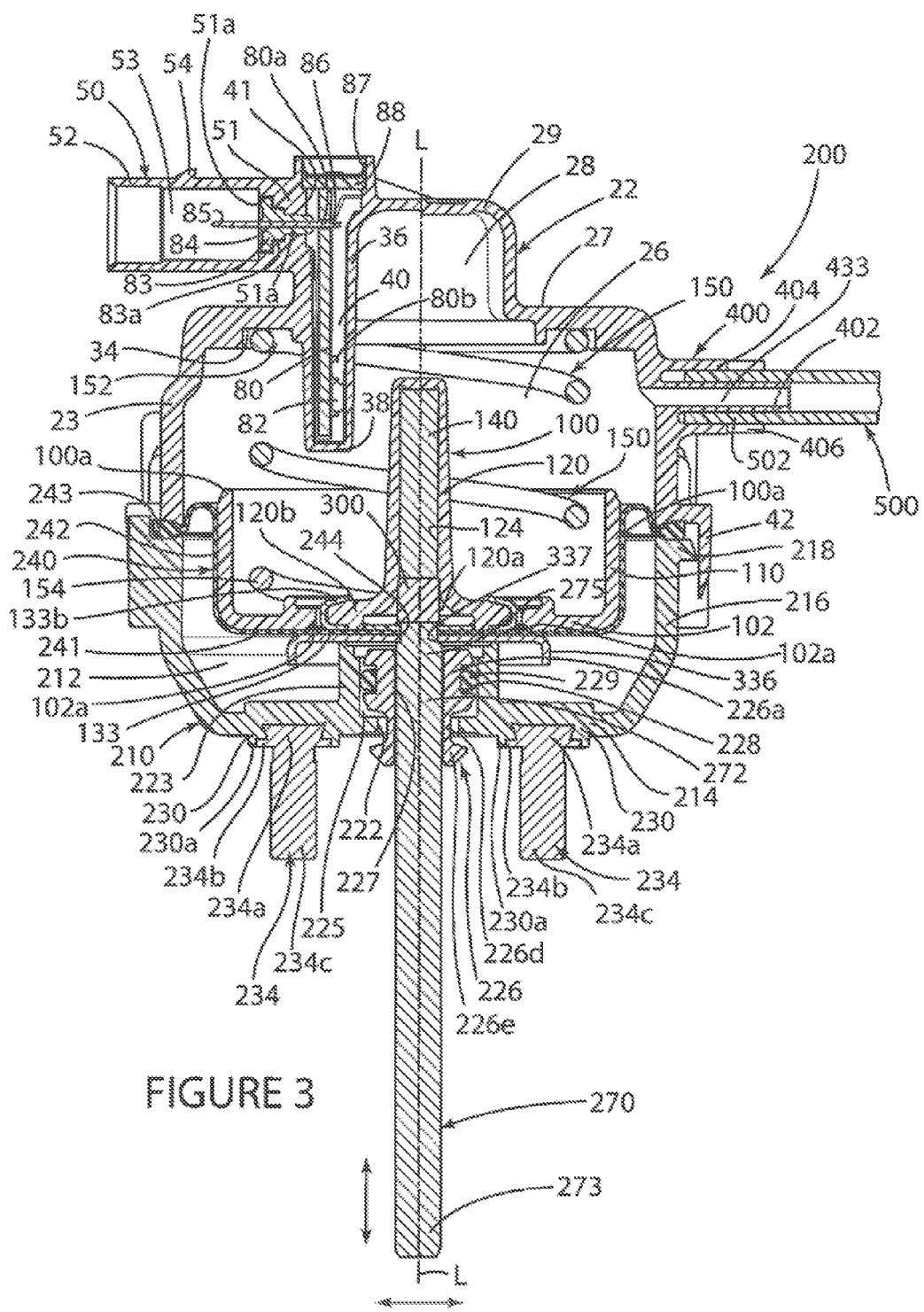
FIG. 3 is a vertical cross-sectional view of the actuator and linear position sensor assembly shown in FIG. 1 with the magnet assembly and actuator rod fully retracted in the assembly.
Figure 4:
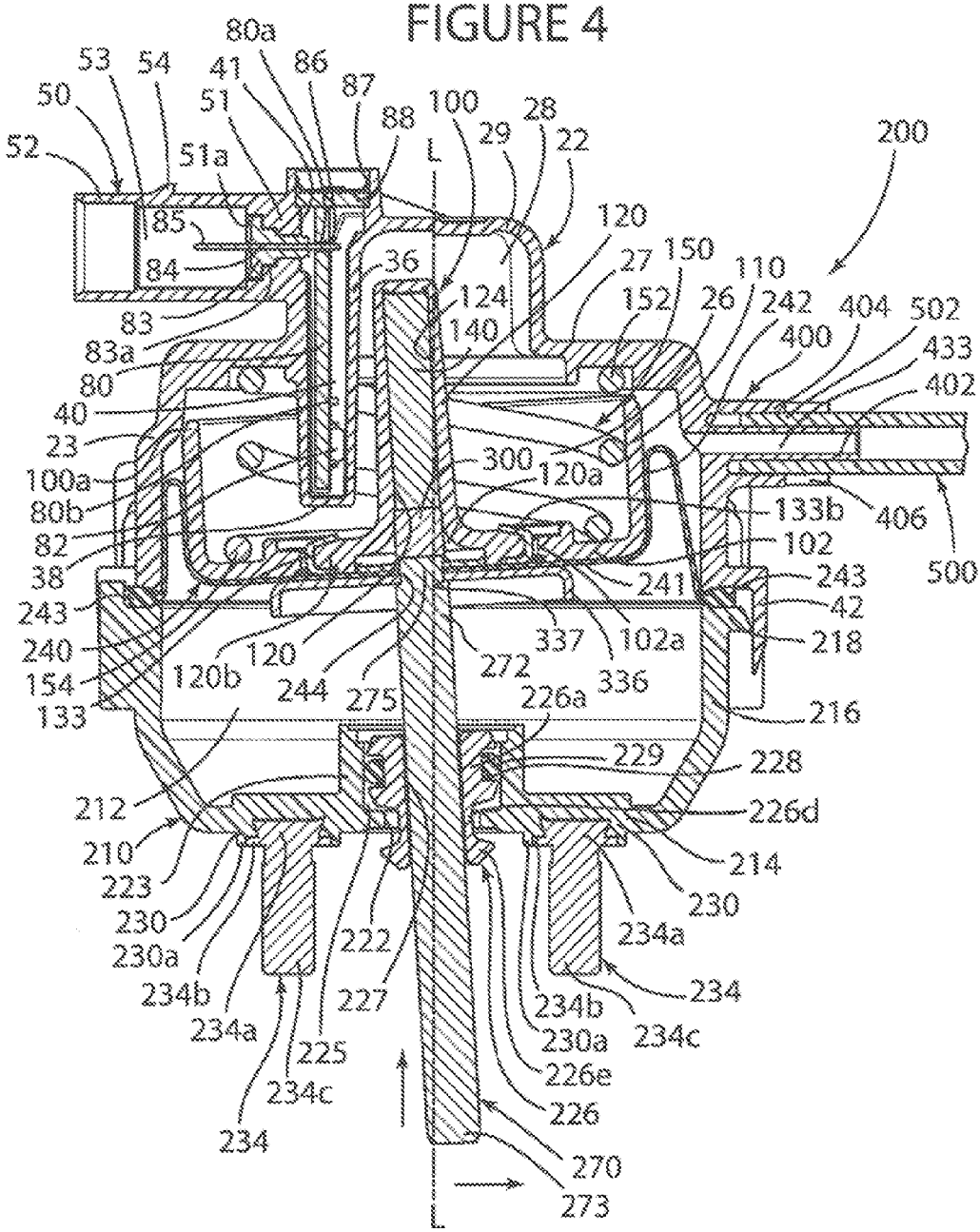
FIG. 4 is a vertical cross-sectional view of the actuator and linear position sensor assembly shown in FIG. 1 with the magnet assembly and actuator rod extended in the assembly

Sensor housing or cover member 22 which, in the embodiment shown is made from a suitable injection molded plastic and is generally dome-shaped, includes a horizontal top well or roof 27 and a unitary downwardly and vertically extending circumferential exterior skirt wall 23. The roof 27 and the skirt wall 23 together define an interior sensor housing cavity or chamber 26 (FIGS. 3 and 4).

Referring to FIGS. 1, 2, 3, 4, and 7, a hose retention and coupling device or assembly 400 extends generally horizontally outwardly from the exterior surface of the skirt wall 23 in a relationship generally normal to the central vertical longitudinal axis L of the assembly 200.

The hose retention and coupling assembly 400 comprises a nozzle 402 defining an interior port or passage 433 (FIGS. 3 and 4) in fluid flow communication with the interior of the sensor housing cavity 26. The nozzle 402 is connected to a source of pneumatic fluid such as air via a hollow air hose 500 extending between the nozzle 402 and the source of pneumatic fluid.

The hose retention and coupling device or assembly 400 also includes a retention and protection sleeve or shroud or collar 404 surrounding and spaced from the nozzle 402. The sleeve 404 terminates in a plurality of spaced-apart and circumferentially extending flexible hose retention fingers or tabs 406.

The hose 500 is secured to the hose retention and coupling device or assembly 400, i.e., the end 502 of the hose 500 is slid over and coupled to the end of the nozzle 402. Still more specifically, the hose 500 is coupled to the nozzle 402 in a relationship with the end 502 of the hose 500, and more specifically the interior surface of the end 502 of the hose 500, surrounding and abutted against the exterior circumferential surface of the nozzle 402 and the interior circumferential surface of the sleeve 404 surrounding and abutted against the exterior circumferential surface of the hose 500. Thus, in the embodiment shown, the hose 500 is sandwiched between the nozzle 402 and the sleeve 404.

The retention tabs or fingers 406 are adapted for flexing into the exterior surface of the hose 500 to securely retain the hose 500 on the nozzle 402. The sleeve or shroud 404 also advantageously provides and defines a cover that protects the nozzle 402 from external objects and damage during transit and also during operation.

A circumferential recess or groove 34 (FIGS. 3 and 4) is defined in a portion of the interior surface of the roof 27 of the housing member 22 and is positioned in a relationship surrounding the dome 29.

A dome 29 projects unitarily upwardly and outwardly form the exterior surface of the roof 27 and defines an interior hollow dome shaped cavity 28 (FIGS. 3 and 4) that opens into and is in communication with the interior sensor housing cavity 26.

Referring specifically to FIGS. 3 and 4, an elongate and generally vertically extending sensor/substrate interior cavity or pocket 40 is defined in the dome 29 of the housing member 22 and is accessible through an access opening 41 defined in the top surface of the dome 29. The pocket 40 is defined by a circumferentially extending wall 35 that projects and extends vertically downwardly into the cavity 26 of the housing member 22 from the interior surface of the top of the dome 29. The well 36 terminates in a horizontal lower wall 38 that closes the bottom of the pocket 40 and isolates and separates the pocket 40 from the interior cavity 26.

In the embodiment shown, the vertical interior wall 36 and vertical interior pocket 40 defined by the vertical interior wall 36 extend in the same direction as the central longitudinal vertical axis L of the assembly 200 and, in the embodiment shown, are both positioned in an off-setting, spaced-apart, and generally parallel relationship relative to the longitudinal vertical central axis L of the assembly 200.

A plurality of generally L-shaped flexible elongate clips or fingers 42 (FIGS. 1, 2, 3, and 4) protrude outwardly from the distal end of the skirt well 23 of the housing member 22 and are adapted to allow the clipping of the sensor housing member 22 to the actuator housing member 210.

A connector assembly 50 (FIGS. 1, 2, 3, and 4), which may also the made from any suitable injection molded plastic, is unitary with the roof 27 of the housing me her 22 and, more specifically, extends unitarily horizontally outwardly from the side wall of the dome 29 of the housing member 22 and still more specifically extends unitarily normally outwardly from the wall 36 of the pocket 40. In the embodiment shown, the nozzle 402 and connector assembly 50 are located on opposite sides of the central vertical longitudinal axis L of the assembly 200 and the connector assembly 50 is located and positioned directly opposite and spaced from and generally normal to the wall 36, the pocket 40, and the substrate 80.

Connector assembly 50 includes a body 51 and a shroud 52 that extends unitarily from the body 51. The body 51 is unitary with the wall 36 of the pocket 40 and the wall 36 separates the pocket 40 from the interior of the connector assembly 50. The shroud 52 defines an open interior 53 (FIGS. 3 and 4). A locking tab 54 is located on and projects outwardly from a top exterior surface of the shroud 52. An electrical connector (not shown) is adapted to be coupled to the end of the shroud 52 and retained to the shroud 52 by the locking tab 54. The electrical connector (not shown) may be connected to a wire harness (not shown).

Connector assembly 60 includes a compliant in holder or retainer 83 (FIGS. 2, 3, and 4) that includes a plurality of (namely three) electrically conductive compliant terminal or connector pins 84 that are insert-molded into and extend through the body of the retainer 83. In the embodiment shown, the pins 84 are insert molded in the retainer 83 in a spaced-apart, co-planar, and parallel relationship relative to each other.

The retainer 83 is retained in the interior of the connector assembly 50 and the shroud 52 and more specifically is retained in the body 51 of the connector assembly 50 and wall 36 and still more specifically is retained in a through-hole defined by an interior circumferential wall 51a defined in the body 51 and wall 36 that separates the connector assembly 50 from the pocket 40.

In the embodiment shown, the retainer 83 includes an exterior surface 83a that includes a plurality of steps or shoulders and the interior wall 51a includes a plurality of steps or shoulders adapted to mate or mesh with the plurality of steps or shoulders on the exterior surface 83a of the retainer 83 so as to provide for a secure and accurate alignment and positioning of the retainer 83 in the connector assembly 50 and more specifically to provide for an accurate alignment of the pins 84 relative to and with the through-holes 80a defined in the substrate 80 during assembly.

Each of the pins 84 defines respective opposed distal ends 85 and 86 (FIGS. 3 and 4). The pin end 85 is located in the interior cavity 53 defined by the shroud 52 and is adapted for connection to the electrical connector (not shown). The pins 84 and the respective ends 86 thereof extend through the body 51 and wall 36, into the pocket 40, and through the body of the substrate or printed circuit board 80 located in the pocket 40. In the embodiment shown, the retainer 83 and the pins 84 are disposed and oriented and positioned in a relationship opposite and generally normal to the substrate 80 and the longitudinal axis L of the assembly 200.

The compliant design of the pins 84 eliminates the need for wire bonding or soldering of the terminal pins 84 to the through-holes 80a of the substrate 80. Additionally, the design shown with the connector assembly 50 and the terminal pins 84 located directly opposite and generally normal to the wall 36, the pocket 40, and the substrate 80 allows the pins 84 to be pushed directly normally inwardly through the connector assembly 50, the wall 36, the pocket 40, and into the respective through-holes 80a in the substrate 80 during the manufacturing and assembly of the assembly 200.

Substrate 80 can be a conventional printed circuit board formed from FR4 or the like material. The substrate 80 extends vertically through the pocket 40 in an offset, spaced, and parallel relationship relative to the central longitudinal vertical axis L of the assembly 200. In the embodiment shown, the substrate 80 defines a plurality of (namely three) through-holes 80a (FIGS. 2, 3, and 4) extending through the body and opposed sides of the substrate 80. In the embodiment shown, the through-holes 80a are positioned adjacent and spaced from the top edge of the substrate 80 and in a spaced-apart, co-linear, and parallel relationship relative to each other. The through-holes 80*a* are defined by respective interior circumferential surfaces covered with a layer of electrically conductive material.

Figure 2:
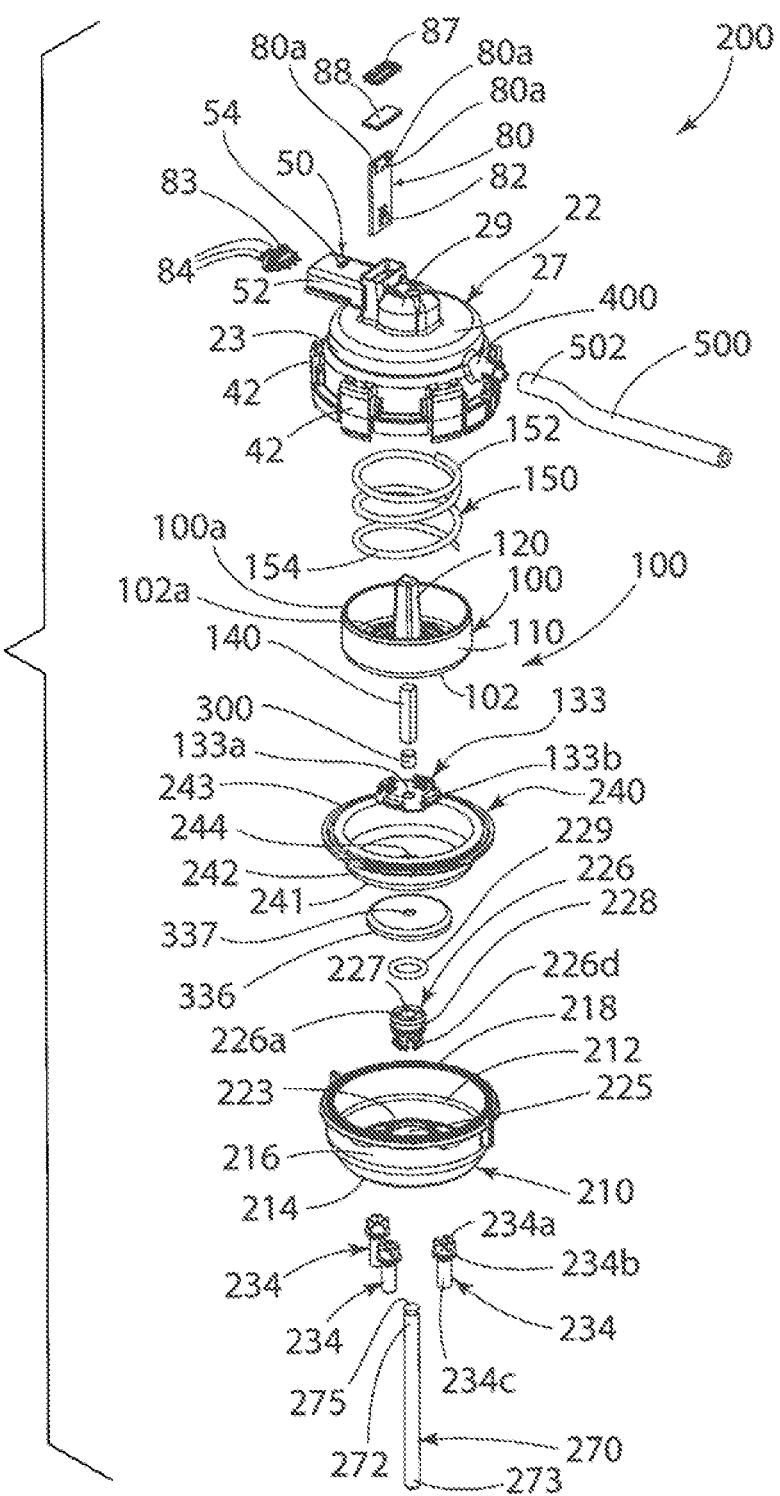
FIG. 2 is an exploded perspective view of the actuator and linear position sensor assembly shown in FIG. 1.

During the assembly process and as shown in FIG. 2, the substrate 80 is inserted vertically downwardly and inwardly into the pocket 40 via and through the access opening 41 defined in the to of the dome 29 of the housing member 22. Also, during the assembly process, and following insertion of the substrate 80 into the pocket 40, the pin retainer 83 is inserted horizontally forwardly or inwardly into the interior of the connector assembly 50 and more specifically into the interior of the shroud 52 thereof and still more specifically into the aperture 51*a* in the body 51 and wall 36 and the end 85 of the pins 84 are extended into the pocket 40 and through the respective through-holes 80*a* in the substrate 80.

Thereafter, a separate press-fit cover or top or plug 87 is inserted over and seals the opening 41. The plug 87 could also be adapted for ultrasonic welding to the opening 41 of the housing member 22. A spacer 88 (FIGS. 2, 3, and 4) is positioned in the pocket 40 between, and in an abutting relationship with, the top peripheral edge of the substrate 80 and the plug 86. During assembly, the plug 86, which is press-fitted into the opening 41 in the top of the dome 29, exerts a compressive force against the spacer 88 which in turn exerts a compressive force against the top peripheral edge of the substrate 80 for supporting, securing, and preventing vibration and movement of the substrate 80 and sensor 82 thereon during use of the assembly 200 and also for assuring continued abutting electrical contact between the terminal pins 84 and the interior surface of the respective substrate through-holes 80*a* and preventing vibration damage to the pins 84.

Additionally, or in lieu of, the plug 87 and spacer 88, a curable epoxy or the like material can be dispensed into the pocket 40 through the opening 41 to a level covering the top of the substrate 80 for further securing the substrate 80 in the pocket 40 against vibration. A low pressure over mold operation could also be used in lieu of epoxy.

A sensor 82 (FIGS. 2, 3, and 4) is mounted to one of the exterior side surfaces of the distal or lower end of the substrate 80. Sensor 82 can be a magnetic field sensor such as a Hall Effect device. In one embodiment, the sensor 82 is an integrated circuit available from Melexis Corporation of Leper, Belgium which is adapted to sense and measure at least changes in the magnitude and direction of the magnetic field generated by the magnet 140.

Other electronic components, generally designated with the numeral 80*b* in FIGS. 3 and 4, including for example capacitors, resistors, inductors and other signal conditioning components, are mounted on one or both of the exterior side surfaces of the substrate 80. Additionally, it is understood that one or more circuit lines (not shown) are also located and defined on or in the substrate 80 for electrically connecting the sensor 82 and the other electronic components 80*b* thereon to the end 86 of the respective compliant pins 84 of the connector assembly 50.

The actuator assembly 200 also comprises a lower or bottom actuator housing member 210 (FIGS. 1, 2, 3, 4, and 6) which is also made from a suitable injection molded plastic.

Referring to FIGS. 3 and 4, the housing member 210 includes a generally circular bottom horizontal wall or floor or base 214 and a circumferential side wall 216 which extends generally unitarily vertically upwardly from a peripheral circumferential edge of the floor 214. The walls 214 and 216 together define a cup-shaped housing member 210 which defines an interior cavity or chamber 212. An upper terminal end portion of the side wall 216 defines a circumferentially extending and outwardly projecting flange or collar or ledge or lip 218. A central bottom circular through aperture or opening 222 in the floor 214 defines an entry into the interior cavity or chamber 212.

A collar 223 protrudes generally normally unitarily upwardly from a center portion of the interior surface of the floor 214 of the housing member 210. Wall 223 surrounds and is spaced from the central aperture 222 defined in the floor 214 of the housing member 210.

The collar 223 defines an interior pocket or cavity or receptacle 225 for a gimbal 226. Referring to FIGS. 2, 3, 4, 5, and 6, the gimbal 226 defines a central through aperture 227 and an outer surface defining a circumferential recess 228 for an O-ring 229 which provides a flexible mechanical bearing between the interior surface of the collar 223 of the housing member 210 and the gimbal 226.

Figure 5:
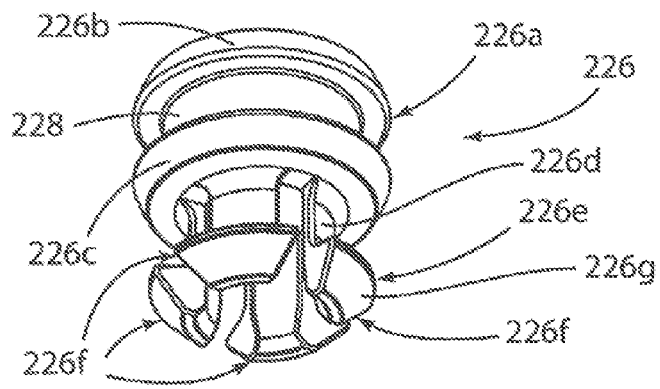
FIG. 5 is an enlarged perspective view of the gimbal of the actuator and linear position sensor assembly of the present invention.
Figure 6:
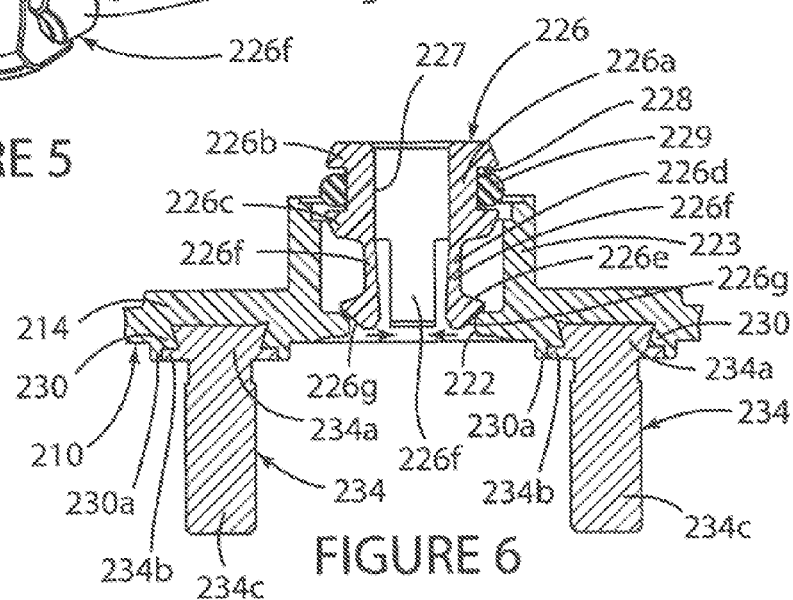
FIG. 6 is a broken vertical cross-sectional view depicting the assembly of the gimbal shown in FIG. 5 to the actuator housing of the actuator end linear position sensor assembly.
Figure 7:
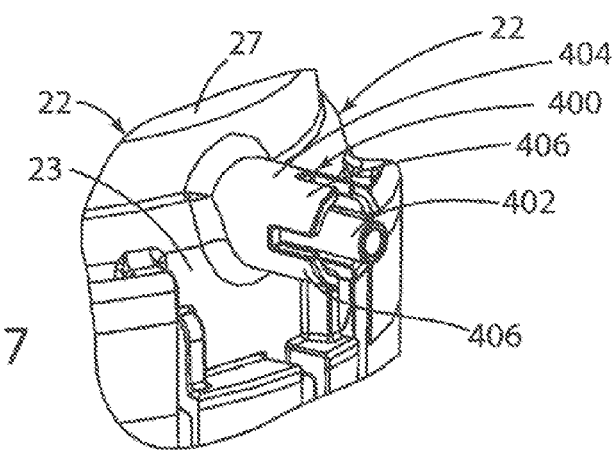
FIG. 7 is an enlarged broken perspective view of the hose retention assembly of the actuator and linear position sensor assembly of the present invention.

More specifically, and referring to FIGS. 5 and 6, the gimbal 226 includes a generally cylindrically shaped head 226*a*. The head 226*a* includes a circumferentially extending exterior well having en interior cylindrical surface defining the central through aperture 227. The exterior circumferential surface of the head 226*a* of the gimbal 226 includes a pair of circumferentially extending and spaced apart flanges 226*b* and 226*c* which together define the circumferential recess 228 in the exterior circumferential surface of the head 226*a* of the gimbal 226. A flexible neck 226*d* extends and depends unitarily downwardly from the lower exterior circumferential edge of the head 226*a* and terminates in a shoulder 226*e*. In the embodiment shown, the neck 226*d* is in the form of and comprises a plurality of spaced apart and circumferentially extending flexible ribs 226*f* each terminating in a flange or shoulder 226*e* having an exterior angled camming surface 226*g*.

The gimbal 226 is adapted to be snap titled into and sec cured to the actuator housing member 210. Specifically, and referring to FIG. 5, during the process of assembling and manufacturing the assembly 200, the gimbal 226 is inserted vertically downwardly or inwardly into and through the interior of the collar 223 of the actuator housing member 210 initially into the relationship as shown in FIG. 5 wherein the neck 226*d* is located in the collar 223 and the exterior angled camming surface 226*g* of the shoulder 226*e* on each of the ribs 226*f* is brought into abutting relationship with the circumferential surface of the base wall aperture 222 and causes the inward flexing of the neck 226*d* and more specifically the ribs 226*f* towards each other.

The gimbal 226 is then extended or pushed further downwardly or inwardly into the collar 223 which causes the shoulder 226*e* to clear the base wall aperture 222 which in turn causes the neck 226*d* and more specifically the ribs 226*f* to flex back outwardly from each other into the position as shown in FIGS. 3 and 4 in which the gimbal 226 is snap fitted and secured in the actuator housing 210 in a relationship wherein the neck 226*d* and more specifically the neck 226*d* and the ribs 226*f* defining the same extend through the base wall aperture 222, the head 226*a* of the gimbal 226 is located inside the collar 223, the base wall 214 is located between the head 226*a* and the shoulder 226*e* of the gimbal 226 to retain the gimbal 226 in the collar 223, and the O-ring 229 is located in the recess 228 of the head 226*a* and in a relationship surrounding and abutting against both the exterior surface of the head 226*a* and the interior surface of the collar 223.

Thus, in the embodiment shown, the head 226a of the gimbal 226 has a diameter greater than the diameter of the opening 222, the neck 226d has a diameter less than the diameter of both the head 226a and the opening 222 so as to allow the neck 226d to be fitted through the opening 222, and the shoulder 226e has a diameter greater than the diameter of the opening 222 with the shaft 273 extending through the gimbal 226 to retain and lock the gimbal 226 on the collar 223.

The floor 214 of the housing member 210 additionally defines a plurality of hollow peripheral heads 230 (FIGS. 3, 4, and 6) protruding outwardly from the interior surface of the floor 214. Each of the heads 230 defines an opening and a generally ring-shaped collar 230a projecting outwardly from the exterior surface of the floor 214 of the housing member 210.

Actuator assembly 200 further comprises a plurality of threaded mounting screws or bolts 234 which are insert molded into the respective heads 230 defined in the floor 214 of the housing member 210. Specifically, each of the screws 234 includes a head 234a which is insert molded into the respective head 230 in the floor 214 of the housing member 210 and a ring or flange 234b which surrounds the head 234b and extends into abutting relationship with the interior surface of the collar 230a formed in the floor 214 of the housing member 210.

Each of the screws 234 further includes a distal leg 234c adapted to extend through the respective openings of a supporting bracket (not shown) which is fastened to a vehicle engine or engine component such as, for example, a vehicle engine turbocharger.

The respective housing members 22 and 210 are snap-fitted or clipped together as shown in FIG. 1 and together define an interior actuator and sensor assembly cavity that is defined by the combination of the sensor housing cavity 26 and the actuator housing cavity 212.

Actuator and linear position sensor assembly 200 further comprises a flexible robber plunger or diaphragm 240 (FIGS. 2, 3, and 4) located in the cavity 212 of the housing member 210. The diaphragm 240 is in the shape of a cup having a bottom annular well or floor or base 241 and a peripheral circumferentially extending vertical side wall 242 including a distal outwardly projecting and circumferentially extending flange or collar or lip or bead 243. The floor 242 of the diaphragm 240 defines a central opening 244 (FIGS. 3 and 4).

The collar or flange or bead 243 of the diaphragm 240 is wedged and secured between the top exterior surface of the flange 218 of the housing member 210 and the terminal exterior end surface of the wall 23 of the housing member 22 in the coupled and snapped together relationship of the respective housing members 22 and 210 shown in FIGS. 3 and 4.

Actuator and linear position sensor assembly 200 still further comprises a piston washer 336 defining a central aperture 337 (FIGS. 2, 3, and 4). Piston washer 336 is seated in the interior of the assembly 200 against the top exterior peripheral circumferential end surface of the collar 223 of the housing member 210 in a relationship wherein the central aperture 337 of the washer 336 is aligned with the central aperture 222 defined in the floor 214 of the housing member 210.

Actuator and linear position sensor assembly 200 still further comprises an elongated rod or actuator shaft 270 including opposed ends 272 and 273 (FIGS. 2, 3, and 4). The end 273 of the shaft 270 can be attached to a variety of objects whose linear position requires adjustment or measurement such as, for example, the by-pass or waste gate valve of a turbo-charger associated with a vehicle engine. The end 272 of the shaft 270 additionally defines a head 275.

A combination piston and magnet carrier assembly 100, which may be made from a suitable injection molded plastic, is also located in the interior of the assembly 200 and, more specifically, in the cavities 26 and 212 of the respective housing members 22 and 210 as described in more detail below.

Piston/magnet carrier assembly 100 includes a cup 100a with a horizontal base or floor 102 and a circumferential vertical side wall 110 which extends unitarily generally normally upwardly from the peripheral circumferential edge of the base 102.

Piston/magnet carrier assembly 100 also includes a hollow tube or receptacle 120 (FIGS. 2, 3, and 4) which, in the embodiment shown, is generally cylindrically shaped and extends centrally unitarily upwardly from the base 102 of the cup 100a in a relationship generally normal to the base 102. The tube 120 is defined by a circumferential cylindrical vertical will that defines an elongate interior magnet receiving bore or pocket or receptacle 124.

The tube or wall 120 is closed at the top and defines an opening 120a at the bottom that is defined by a central opening in the base 102 of the cup 100a of the piston/magnet carrier assembly 100. The tube or wall 120 defines a base 120b (FIGS. 3 and 4) in the floor 102 of the cup 100a and the floor 102 defines one or more apertures 102a surrounding the base 120b of the tube 120.

An elongated magnet 140 is inserted and press fitted into the interior of the tube 120 of the piston/magnet carrier assembly 100 through the opening 120a in the bottom of the tube 120 during the assembly and manufacturing operation.

The magnet 140 is a permanent magnet that is polarized to define a north pole and a south pole. Magnet 140 can, in one embodiment, be made from any one of several different magnetic materials such as, but not limited to, ferrite or samarium cobalt or neodymium-iron-boron. Magnet 140 can be cylindrical in shape as shown or may be of any other desired shape or configuration such as, for example, square and thus it is also further understood that the tube 120 may also be shaped and configured to accept or house any other differently shaped or configured magnet such as, for example, a square shaped tube to accept or house a square shaped magnet.

The shaft 270 is secured to the cup 100a of the piston/magnet carrier assembly 100 via a crimp plate 133 (FIGS. 2, 3, and 4) also located in the interior of the housing member 210. Specifically, during the assembly process, the end 273 of the shaft 270 is extended through a central aperture 133a defined in the crimp plate 133 and into the relationship as shown in FIGS. 3 and 4 in which the head 275 of the shaft 270 is abutted against the top exterior surface of the crimp plate 133.

The crimp plate 133 includes a plurality of spaced-apart peripheral crimp fingers 133b that extend through the one or more apertures 102a that are defined in the floor 102 of the cup 100a of the piston/magnet carrier assembly 100 and which are crimped and wrapped around the base 120a of the tube 120a for securing the plate 133 to the cup 100a and thus securing the shaft 270 to the cup 100a of the piston/magnet carrier assembly 100.

Thereafter, and still during the assembly process, the piston/magnet carrier assembly 100 with the diaphragm 240 and the shaft 270 coupled thereto is mounted in the interior of the cavity 212 of the housing member 210 into the relationship as shown in FIGS. 3 and 4 wherein the cup 100a of the piston/magnet carrier assembly 100 is seated in the interior of the diaphragm 240 and the diaphragm 240 is seated against the top peripheral surface of the collar 223 of the housing member 210 and the shaft 270 extends successively through the openings 227 and 222 defined in the gimbal 226 and the base 214 of the housing member 210 respectively.

The extension of the end 272 of the actuator rod 270 through the interior of the gimbal 226 also prevents the inward flexing of the gimbal neck 226*d* and gimbal ribs 226*f* which in turn prevents the gimbal 226 from sliding out of the collar 223 and thus the rod 270 also acts as a pin that locks the gimbal 226 on the collar 223.

In the embodiment shown, an elastomeric spacer 300 is located in the tube 120 of the magnet carrier 100 and is wedged between the top of the head 275 of the shaft 270 and the bottom of the magnet 140 to allow the control of the position of the magnet 140 in the tube 120.

Also, in the position of FIG. 3, the tube 120 and the magnet 140 are positioned in a co-axial relationship with the central longitudinal vertical axis L of the assembly 200 and further in a relationship spaced from and parallel to the interior wall 36, the interior pocket 40, and the sensor 82 located in the interior pocket 40.

The assembly 200 still further comprises a helical metal coil spring 150 which is also located in the interior of the assembly 200 and, more specifically, is located and mounted in the region of the interior cavity 26 bounded by the interior surface of the roof 27 of the housing member 22 at one end and the base 102 of the piston/magnet carrier assembly 100 at the other end. Coil spring 150 has opposed end coils 152 and 154. End 152 is seated in and against the groove 34 defined in the interior surface of the roof 27 of the housing member 22 and the end 154 is seated against the top surface of the base 102 of cup 100*a* of the piston/magnet carrier assembly 100. Spring 150 surrounds and is spaced from the tube 120. Spring 150 also surrounds and is spaced from the wall 36 and the sensor pocket 40. Thus, in the embodiment shown, the pocket 40 is located between the magnet carrier tube 120 and the spring 150 and further the spring 160 surrounds both the tube 120 and the pocket 40.

The spring 150 biases and keeps the piston/magnet carrier assembly 100 in a first fully retracted position as shown in FIG. 3 against the top of the collar 223 of the housing member 210 and is oriented such that the spring 150 can be compressed and depressed along the axis of movement of piston/magnet carrier assembly 100.

Although not shown or described in great detail herein, it is understood that the hose or tubing 500 is connected to a source of vacuum such as an engine intake manifold or vacuum tank (not shown). An increase in the vacuum in the tube 500 causes a decrease in the air pressure in the interior of the assembly 200 and causes the piston/magnet assembly 100 to move linearly upwardly from its first position as shown in FIG. 3 to a plurality of intermediate extended linear and angular positions (not shown) in the interior of the assembly 200 wherein the piston/magnet carrier assembly 100 is located entirely in the interior chamber 26 defined by the housing member 22 and the tube 120 is at least partially extended into the interior cavity 28 defined by the dome 29 of the housing member 22. In this second position, the spring 150 would be compressed.

A decrease in the vacuum in the tube 500 and thus an increase in the air pressure in the interior of the assembly 200 and, more specifically, the interior cavities 26 and 212 defined by the respective housing members 22 and 210, causes the piston/magnet carrier assembly 100 to move linearly downwardly in the chamber or cavity 212 back to its biased retracted first position of FIG. 3 wherein the plate 336 coupled to the bottom of the piston/magnet carrier assembly 100 is abutted against the top of the wall 223 of the housing member 210 and the spring 150 is in its fully extended position.

Piston/magnet carrier assembly 100 thus is capable of moving linearly and angularly in the interior of the assembly 200 with respect to the Hall Effect sensor 82 which is located inside the pocket 40 in a generally opposed, adjacent, and isolated relationship relative to the magnet 140. The sensor 82 is spaced, separated, and isolated from the magnet 140 by the pocket wall 36. The magnetic field produced by the magnet 140 passes through the wall 36 where the magnitude and/or direction of the magnetic field is sensed by the sensor 82. As the magnet 140 moves linearly and angularly in the interior of the assembly 200 relative to the sensor 82, the north and south poles change position relative to the sensor 82 thus creating a change in the magnitude and/or direction of the magnetic field. The changes in the direction and/or magnitude of the magnetic field can be sensed about two axes by the sensor 82.

Sensor 82 produces an electrical signal that changes in response to the position of the magnet 140 and thereby also a change in the position of the shaft 270. The electrical signal produced by the sensor 82 is indicative of the position of the magnet 140 and the piston/magnet carrier assembly 100. As the magnitude or strength of the magnetic field generated by the magnet 140 vanes with the linear movement of the shaft 270, the electrical output signal produced by sensor 82 changes accordingly, allowing the position of the shaft 270 and thus the object coupled thereto to be determined.

As shown in FIG. 4, it is understood that the piston/magnet carrier assembly 100 is adapted for see-saw, tilting, side-to-side movement in the interior cavity of the assembly 200 in response to a tilting, back and forth, side to side movement of the shaft 270 which, in turn, allows for the tilting, side to side movement of the tube 120 and the magnet 140 in the interior cavity of the assembly 200 relative to the sensor 82 which results in a change in the direction of the magnetic flux generated by the magnet 140 which is sensed by the sensor 82.

More specifically, and referring to FIGS. 3 and 4, it is understood that the piston/magnet carrier assembly 100, and still more specifically, the tube 120 and the magnet 140 are adapted for a first up and down vertical and linear movement in a relationship generally co-linear with the vertical longitudinal axis L of the assembly 200 in response to a first linear up and down vertical movement of the moveable object (not shown) connected to the end 273 of the shaft 270 and a second see-saw, tilting, side-to-side movement in a relationship angled to the longitudinal axis L of the assembly 200 in response to the angled side to side movement of the moveable object (not shown) connected to the end 273 of the shaft 270.

Stated yet another way, the sensor 82 is positioned a fixed transverse distance from the longitudinal axis L of the assembly 200 and a variable transverse distance from the magnet 140 depending upon the angle of the magnet 140 relative to the longitudinal axis L of the assembly 200. Thus, the transverse spacing and distance between the sensor 82 and the magnet 140 in a direction transverse to the longitudinal axis L of the assembly 200 is variable in response to the second angular movement of the magnet 140.

It is also understood that the gimbal 226, as also shown in FIG. 4, tilts and moves angularly in the interior of the collar 223 in response to the tilting and angular movement of the actuator rod 270. The degree of arc or tilt or angular movement of the gimbal 226 is tunable by adjusting or varying the contour or shape of the exterior surface of the gimbal 226 and more specifically the head 226a and neck 226d thereof so as to allow the gimbal 226 to float or move in the interior of the collar 223 relatively free thus reducing constriction and associated wear rate while still providing continuous sealing O-ring contact between the gimbal 226 and collar 223.

While the invention has been taught with specific reference to the embodiment shown, it is understood that a person of ordinary skill in the art will recognize that changes can be made in form and detail without departing from the spirit and the scope of the invention. The described embodiment is to be considered in all respects only as illustrative and not restrictive.

What is claimed is:

1. An actuator and sensor assembly comprising:
   a sensor housing including an interior wall defining a pocket accessible through an opening in the sensor housing;
   a sensor substrate located in the pocket through the opening in the sensor housing, the sensor substrate having a sensor and defining a plurality of conductive through-holes;
   a hose retention assembly including a nozzle extending from the sensor housing and a sleeve surrounding and spaced from the nozzle;
   a hose coupled to and surrounding the nozzle and the sleeve surrounding and abutting against the hose for retaining the hose on the nozzle;
   a connector assembly associated with the sensor housing and located opposite and generally normal to the pocket and the substrate and including a plurality of compliant terminal pins extending into the pocket and the plurality of through-holes in the sensor substrate respectively;
   an actuator housing coupled to the sensor housing and together defining an interior cavity and an actuator housing aperture in communication with the interior cavity, the actuator housing including an interior collar;
   a gimbal including a head located in the collar and a flexible neck extending through the actuator housing aperture in the actuator housing and terminating in a shoulder that retains the gimbal in the collar of the actuator housing;
   an O-ring surrounding the head of the gimbal and in sealing abutting relationship with the interior surface of the collar of the actuator housing;
   a magnet carrier located and movable in the interior cavity and including a magnet adapted to generate a magnetic field and the sensor adapted to sense a change in the magnetic field in response to the movement of the carrier and the magnet in the interior cavity relative to the sensor; and
   an actuator shaft including a first end extending through the aperture in the actuator housing and the gimbal and coupled to the magnet carrier.

2. The actuator and sensor assembly of claim 1 further comprising:
   a flexible diaphragm located in the interior cavity, the magnet carrier being seated on the flexible diaphragm;
   a spring located in the interior cavity against the magnet carrier and biasing the magnet carrier in a first position; and
   a source of pressurization coupled to one of the sensor housing or the actuator housing and in fluid flow communication with the interior cavity for adjusting the pressure in the interior cavity and causing the movement of the flexible diaphragm and the magnet carrier.

3. The actuator and sensor assembly of claim they comprising a plurality of clips on one of the sensor housing or the actuator housing for coupling the sensor housing and the actuator housing together.

4. The actuator and sensor assembly of claim 1 further comprising a plug for sealing the opening defined in the sensor housing and a spacer located in the pocket between the substrate and the plug for exerting a compressive force against the substrate and preventing vibration of the substrate.

5. The actuator and sensor assembly of claim 1 wherein the plurality of terminal pins extend through the interior wall of the pocket and into the pocket.

6. The actuator and sensor assembly of claim 1 wherein the connector assembly further comprises a holder for the plurality of terminal pins, the holder being retained in a through-hole defined in the interior wall of the pocket.

7. The actuator and sensor assembly of claim 1 wherein the neck the gimbal is comprised of a plurality of spaced apart ribs adapted for flexing movement towards and away from frog each other during coupling of the gimbal to the collar of the actuator housing.

8. A sensor assembly comprising:
   a sensor housing including an interior wall defining a pocket accessible through an opening defined in the sensor housing;
   a substrate located in the interior pocket through the opening in the sensor housing and defining a plurality of conductive through-holes;
   a sensor on the substrate;
   a connector assembly unitary with the sensor housing and positioned in a relationship opposite and generally normal to the pocket and the substrate, the connector assembly including a plurality of compliant terminal pins extending into the plurality of conductive through-holes in the substrate and in a relationship generally normal to the substrate; and
   a magnet located in the sensor housing in a relationship spaced from the pocket of the sensor housing and the sensor, the magnet generating a magnetic field and the sensor adapted to sense a change in the magnitude and direction of the magnetic field in response to the movement of the magnet relative to the sensor.

9. The sensor assembly of claim 8 wherein the connector assembly includes a holder for the plurality of terminal pins, the holder being retained in the interior wall of the pocket.

10. An actuator assembly comprising:
    an actuator housing defining an interior cavity and an interior wall defining an aperture in communication with the interior cavity, the actuator housing including an interior collar;
    a gimbal including a head located in the collar and a flexible neck extending through the aperture in the actuator housing and terminating in a shoulder that retains the gimbal in the collar of the actuator housing;
    an O-ring surrounding the head of the gimbal and in sealing abutting relationship with the interior surface of the collar of the actuator housing; and
    an actuator shaft including a first end extending through the aperture in the actuator housing and the gimbal and coupled to the magnet carrier.

11. The actuator assembly of claim 10 wherein the flexible neck is comprised of a plurality of flexible ribs each including a shoulder having an exterior angled surface, the ribs being adapted for flexing movement towards and away from each other when the gimbal is secured to the collar of the actuator housing.

12. The actuator assembly of claim 11 further comprising an actuator shaft extending through the gimbal.

\* \* \* \* \*